(12) United States Patent
Babala

(10) Patent No.: US 6,792,792 B2
(45) Date of Patent: Sep. 21, 2004

(54) DIAGNOSTIC TEST FOR A RESONANT MICRO ELECTRO MECHANICAL SYSTEM

(75) Inventor: Michael L. Babala, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/161,411

(22) Filed: May 31, 2002

(65) Prior Publication Data

US 2002/0178813 A1 Dec. 5, 2002

Related U.S. Application Data

(60) Provisional application No. 60/295,704, filed on Jun. 4, 2001.

(51) Int. Cl.$^7$ .............................................. G01P 21/00
(52) U.S. Cl. .................... 73/1.38; 73/504.02; 73/504.16
(58) Field of Search ................................ 73/1.37–1.38, 73/504.12, 504.16, 504.02

(56) References Cited

U.S. PATENT DOCUMENTS

| | | | |
|---|---|---|---|
| 4,654,663 A | | 3/1987 | Alsenz et al. |
| 4,665,748 A | * | 5/1987 | Peters ...................... 73/504.12 |
| 5,277,053 A | | 1/1994 | McLane et al. |
| 5,285,686 A | * | 2/1994 | Peters ...................... 73/504.15 |
| 5,400,269 A | | 3/1995 | White et al. |
| 5,635,639 A | | 6/1997 | Greiff et al. |
| 5,696,323 A | | 12/1997 | Hulsing, II |
| 5,918,280 A | | 6/1999 | Gang et al. |
| 6,223,597 B1 | | 5/2001 | Watarai |
| 6,250,157 B1 | | 6/2001 | Touge |
| 6,311,555 B1 | | 11/2001 | McCall et al. |
| 6,345,533 B1 | | 2/2002 | Nozoe |
| 6,386,034 B1 | | 5/2002 | Nozoe |
| 6,497,146 B1 | * | 12/2002 | Hobbs et al. ............ 73/504.12 |

FOREIGN PATENT DOCUMENTS

| | | |
|---|---|---|
| DE | 198 45 185 A1 | 4/2000 |
| EP | 0 565384 A1 | 4/1993 |
| EP | 0 642 216 A1 | 3/1995 |
| EP | 0 773 430 A1 | 5/1996 |

* cited by examiner

Primary Examiner—Hezron Williams
Assistant Examiner—Nashmiya Fayyaz
(74) Attorney, Agent, or Firm—MacMillan, Sobanski & Todd, LLC (57) ABSTRACT

A balanced resonant micro electromechanical system angular rate sensor includes a feedback control loop that generates a null signal to rebalance the sense element to cancel any a Coriolis force induced displacement of the proof mass. The null signal is proportional to the Coriolis force and is used as the sensor output signal. A test signal is injected into the null signal feedback control loop. The resulting sensor output signal is a function of the test signal. If there is no change in the output signal following the injection of the test signal or if the output signal resulting from the test signal exceeds a predetermined threshold, the sensor is defective. Because the test signal is used to cancel the proof mass displacement, the test verifies operation of the sensor element.

12 Claims, 6 Drawing Sheets

DIAGNOSTIC TEST FOR A RESONANT MICRO ELECTRO MECHANICAL SYSTEM

CROSS REFERENCE TO RELATED APPLICATIONS

This application claims the benefit of U.S. Provisional Application No. 60/295,704, filed Jun. 4, 2001.

BACKGROUND OF THE INVENTION

This invention relates in general to angular rate sensors and in particular to an apparatus and a method for performing a diagnostic test upon an angular rate sensor.

Angular rate sensors are widely used in many commercial applications, such as, for example, attitude control systems for automobiles, a gyroscope for a navigation system included in a moving object or a hand-shake compensating system for video cameras. Angular rate sensors measure the rate of rotation of a body about its three principle axes. The rotational movement is typically referred to as yaw, pitch and roll which are related to vertical, transverse and longitudinal axes, respectively.

Figures 1, 2, 3:
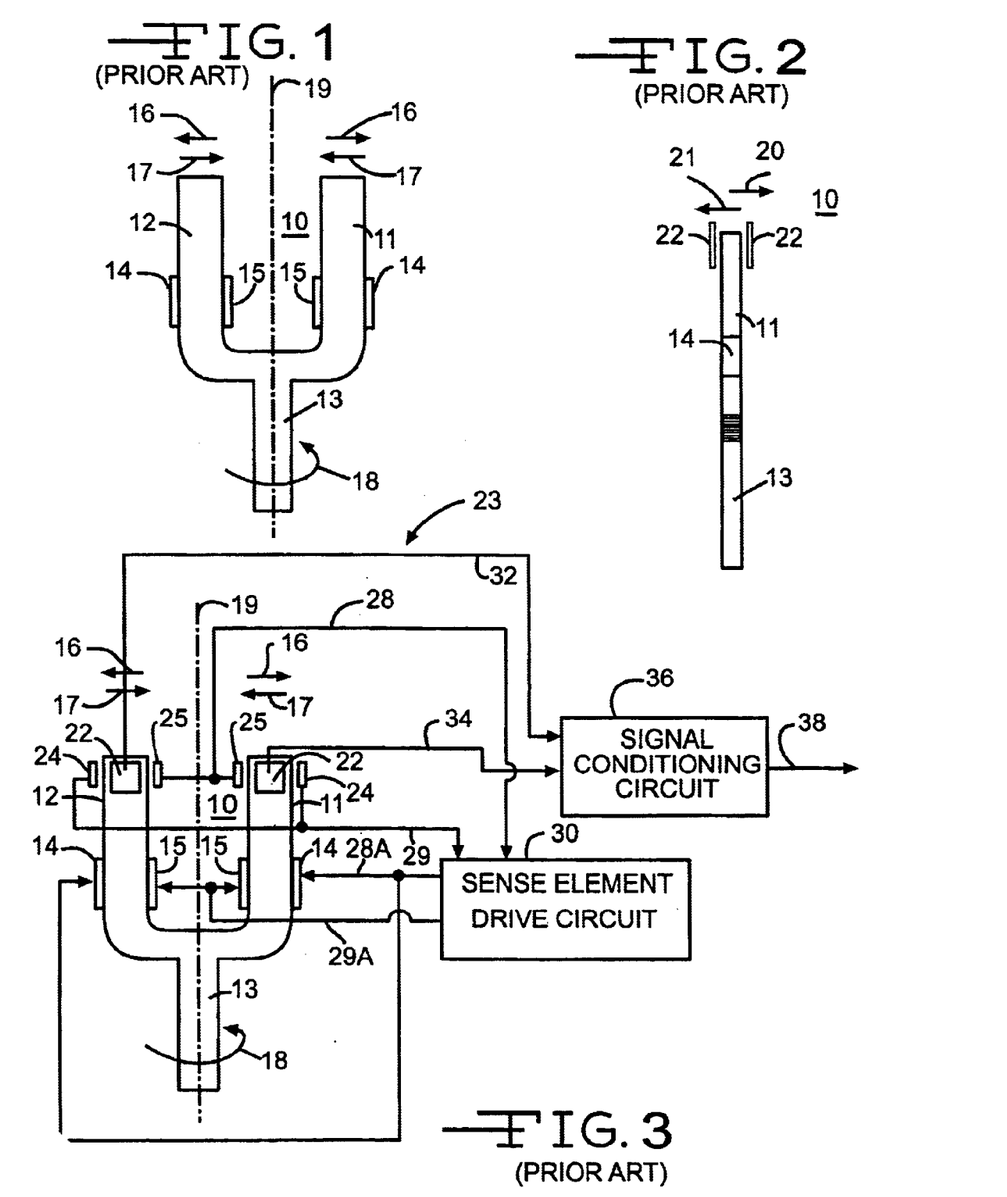
FIG. 1 is a plan view of a tuning fork for explaining the principles of a angular rate sensor.
FIG. 2 is a side elevational view of the tuning fork shown in FIG. 1.
FIG. 3 is a schematic diagram of a typical prior art resonant angular rate sensor that includes the tuning fork shown in FIG. 1.

A simplified angular rate sensor element 10 is illustrated in FIGS. 1 and 2 as a tuning fork. Such sensors typically include a pair of vibrating elements, that are shown as tines 11 and 12 in FIG. 1. The lower ends of the tines 11 and 12 are connected by an output shaft 3. The tines 11 and 12, which function as proof masses, are driven in opposite directions in the plane of the drawing by electrostatic drive motors 14 and 15. The tines 11 and 12 vibrate in the directions shown by the small arrows labeled 16 and 17. when an angular rate, illustrated by the circular arrow 18, is applied to the sensor element 10 about an axis 19 in the plane of the sensor element 10, the tines 11 and 12 are caused to oscillate out of the plane by a Coriolis force due to Coriolis effect, as shown in FIG. 2 by the small arrows labeled 20 and 21. The resulting out-of plane oscillation motion amplitude, which is proportional to the input angular rate, is detected and measured by capacitive or electrostatic pickoff plates 22 that are located adjacent to the upper ends of the tines 11 and 12. While a simplified sensor element 10 has been shown in FIGS. 1 and 2, it will be appreciated that angular rate sensors typically include one, two, four or any plurality of tuning forks in a unitary system.

The size of angular rate sensors has been reduced by the development of resonant Micro Electro Mechanical System (MEMS) angular rate sensors that feature micromachined mechanical components and integrated support electronics. Thus, MEMS includes the concept of integration of microelectronics and micromachining. These devices can be fabricated from various materials, such as, for example, silicon, quartz and ceramics. Examples of successful MEMS devices include inkjet printer cartridges, accelerometers that deploy car airbags and miniature robots.

A schematic diagram for a typical MEMS angular rate sensor 23 is illustrated in FIG. 3. Components shown in FIG. 3 that are similar to components shown in FIGS. 1 and 2 have the same numerical identifiers. Additional capacitive or electrostatic pickoff plates 24 and 25 have been added to measure amplitude and frequency of the oscillation of the tines 11 and 12 within the plane of the sense element 10. The information obtained from pickoff plates 24 and 25 is fed back through the lines labeled 28 and 29 to a closed loop sense element drive circuit 30. While the lines 28 and 29 are shown as single wires, it will be appreciated that the circuit has been simplified for clarity and that multiple wires or traces may actually be used. The sense element drive circuit 26 is conventional and typically includes an oscillator with automatic gain and frequency control (not shown) that receives the feedback from the pickoff plates 24 and 25 to assure that the linear motion is provided to sense element 10. Sense element drive signals are supplied to the electrostatic drive motors 14 and 15 by the output lines 28A and 29A.

Analog data from the Coriolis force pickoff plates 22 is supplied through the lines labeled 32 and 34 to an open loop signal conditioning circuit 36. While the lines 32 and 34 are as single wires, it will appreciated that the drive circuit has been simplified for clarity and that multiple wires or traces may actually be used. The signal conditioning circuit 36 generates an output signal that is proportional to the angular rate on an output line 38. The output signal may be either an analog or a digital signal. The output line 38 is connected to an input port of a microprocessor (not shown).

Figure 4:
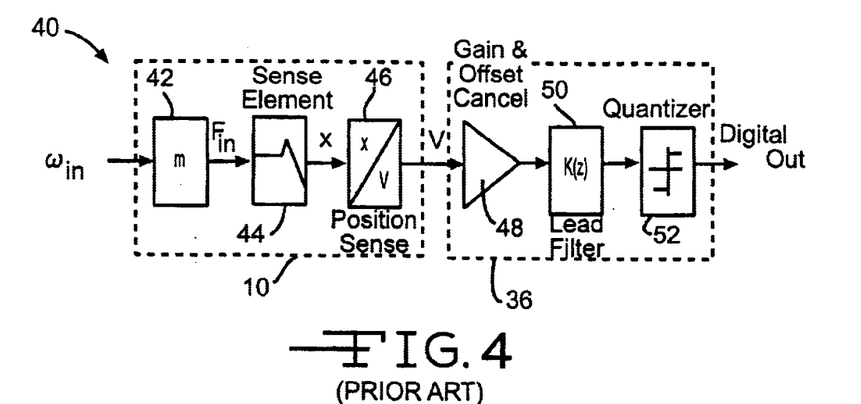
FIG. 4 is a block diagram for the sensor shown in FIG. 3.

A block diagram 40 for typical signal conditioning circuit 36 is illustrated in FIG. 4. Additionally, the sense element 10 is shown in block form. Thus, an input angular rate $\omega_{in}$ is applied to a proof mass, m, or the tines 11 and 12 in the illustrative example, in block 42. The proof mass m responds to the angular rate $\omega_{in}$ with an input force $F_{in}$ that is applied to the sense elements, or the Coriolis force pickoff plates 22, in block 44. The in input force $F_{in}$ is converted to voltage, V, in block 46 and supplied to the signal conditioning circuit 36. The voltage V is amplified and any offset is cancelled in block 48. The amplified signal is filtered in block 50 and then converted to a digital signal by a quantizer in block 52. Alternately, the output of the filter in block 50 can be directly used as an analog signal, in which case the quantizer in block 52 is omitted from FIG. 4.

Figure 5:
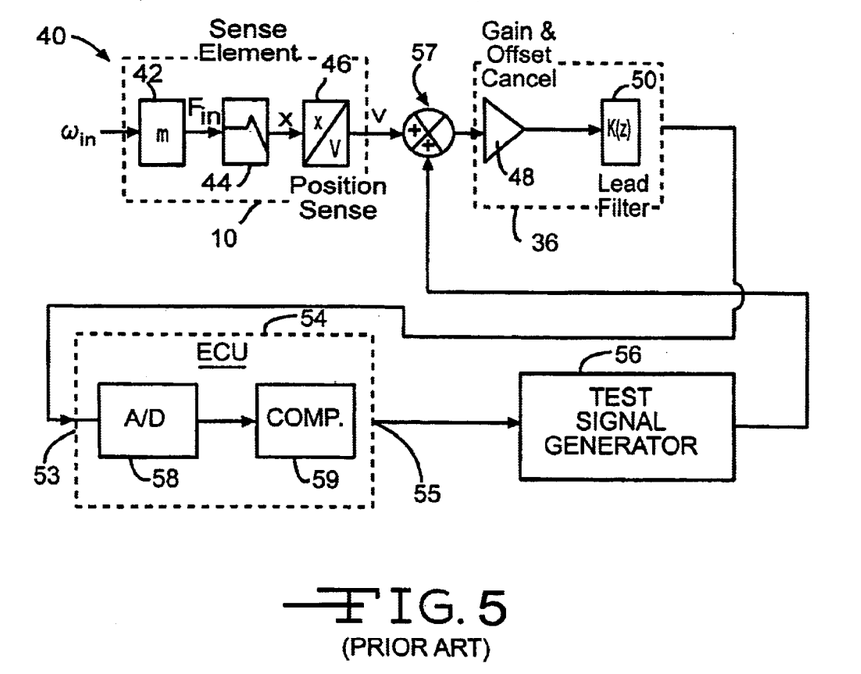
FIG. 5 is a block diagram for a test circuit for the sensor shown in FIG. 3.

It is known to test angular rate sensors as illustrated in FIG. 5. In FIG. 5, the output of the filter block 50 is supplied directly as an analog signal to an analog input pin 53 of an Electronic Control Unit (ECU) 54. The ECU 54 has a test output pin 55 that is connected to a test signal generator 56. The test signal generator 56 generates an analog test signal when the ECU output pin 55 changes state, such as, for example, goes from zero voltage to a high value, which is typically five volts. The analog test signal is injected at point 57 to the input of the signal conditioning circuit 36. The resulting analog output signal is converted to a digital output signal by an analog to digital converter 58 within the ECU 54. The digital output signal is supplied to a comparator 59 that compares the output signal value to an expected value that corresponds to the test signal. If the output signal value is different from the expected value, an error flag is set to indicate that the signal conditioning circuit is malfunctioning. Alternately, the difference between the output signal and the expected value are compared to a predetermined threshold. If the difference exceeds the threshold, the error flag is set. While the test signal generator 56 is shown in FIG. 5 as a separate component, it will be appreciated that the circuit can be included in the ECU 54 (not shown).

The above test exercises all components of the angular rate sensor but the MEMS element. Accordingly, it would be desirable to provide an angular rate sensor that includes a functional test of the sense element 10.

SUMMARY OF THE INVENTION

This invention relates to an apparatus and a method for performing a diagnostic test upon a angular rate sensor.

The present invention contemplates a device for measuring a angular rate comprising a sensor element with a first feedback control device connected to the sensor element, the first feedback control device operative to resonate the sensor element. The device also includes a second feedback control device connected to the sensor element, the second feedback control device operative to sense the presence of a secondary mode signal generated by the sensor element in response to a Coriolis force and to generate a null signal that cancels said secondary mode signal. The second feedback control device also generates an output signal that is proportional to the null signal.

The angular rate measuring device further includes a test device connected to the second feedback control device, the test device being operative to inject a test signal into the second feedback loop such that the test signal is passed through the sense element. Accordingly, the output signal will be proportional to the test signal. The test device is further operative to compare the resulting output signal to the previous output signal and to set an error flag if the output signal has not changed as a result of the injection of the test signal. The test device also sets an error flag if the resulting output signal exceeds a first predetermined threshold or if the change in the output signal exceeds a second predetermined threshold.

The invention also contemplates a method for testing an angular rate measuring device comprising the steps of providing a sensor element and a first feedback control device connected to the sensor element. The first feedback control device is operative to resonate the sensor element. The angular rate measuring device also includes a second feedback control device connected to the sensor element. The second feedback control device is operative to sense the presence of a secondary mode signal generated by the sensor element in response to a Coriolis force and to generate a null signal that cancels the secondary mode signal. The second feedback control device also generates an output signal that is proportional to the null signal.

The method includes first resonating the sensor element and subsequently injecting a test signal into the second feedback control device that is passed through the sense element. Accordingly, the output signal is proportional to the test signal. The method then compares the resulting output signal to the preceding output signal and sets an flag if the output signal has not changed in response to the test signal. Additionally, an error flag is set if the output signal resulting from the test signal exceeds a first determined threshold or if the change in the output signal exceeds a second predetermined threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 6:
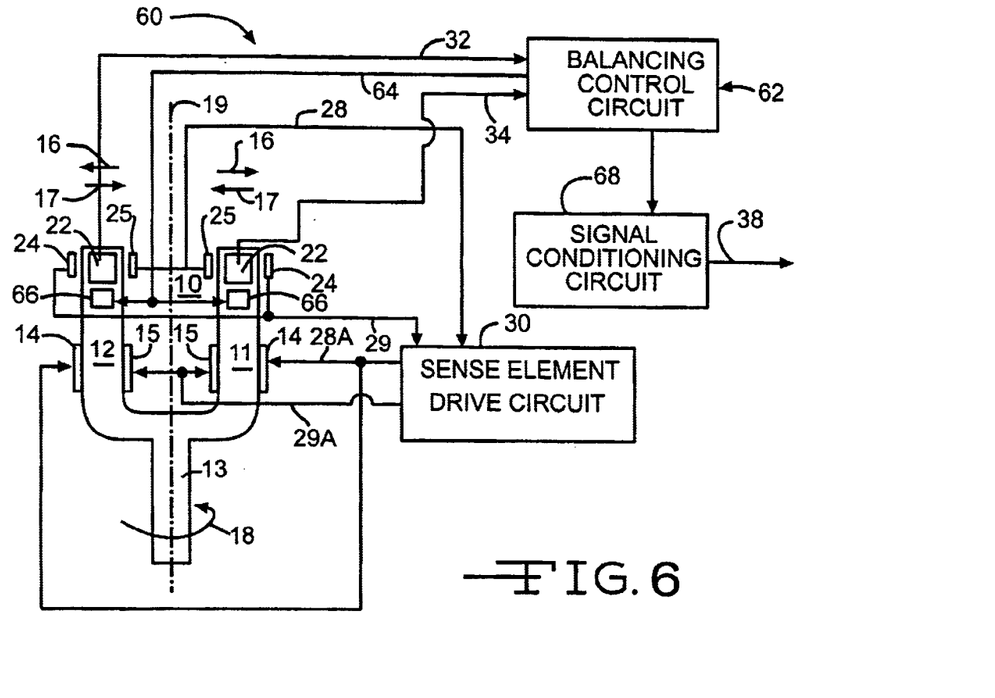
FIG. 6 is a schematic diagram of a balanced resonant angular rate sensor.

Referring again to the drawings, there is illustrated in FIG. 6 a balanced resonant MEMS angular rate sensor 60 that uses a first closed loop control to drive the sense element of an angular rate sensor into resonance and a second closed loop control for detecting the effects of Coriolis force. Components shown in FIG. 6 that are similar to components shown in the preceding Figs. have the same numerical designators. As before, the sense element 10 is shown as a simple tuning fork for clarity; however, it will be appreciated that other conventional structures can be utilized for the sense element. In the preferred embodiment, the sensor 60 is included in a Vehicle Stability Control (VSC) System to measure vehicle yaw about one of the principle vehicle axes. The VSC System is responsive to the angular rate and other signals to selectively actuate vehicle wheel brakes and the engine controls to correct undesired vehicle motion. However, the sensor 60 also can be utilized in other systems to measure angular rates.

As shown in FIG. 6, th closed loop drive for causing the sense element tines 11 and 12 to oscillate within the plane of the sense element 10 is the same as described above. However, the sensor 60 also includes a second closed loop balancing control circuit 62 that receives the Corilolis force induced signals from the Coriolis force pickoff plates 22. The balancing control circuit 62 uses conventional methods to generate a null signal that is applied through a feedback line 64 to null electrostatic drive motors 66, two of which are shown. In the preferred embodiment, another pair of null drive motors (not shown) are positioned on the opposite surface of the tines 11 and 12. The null signal is sufficient to cause the null drive motors 66 to generate an opposite and equal force to the Coriolis force. Accordingly, the null drive motors 66 urge the tines 11 an 12 back into their original position while the null signal is proportional to the Coriolis force. Thus, the feedback balancing control circuit 62 functions as second control loop of the sense element's detection drive. The null signal keeps the proof mass at near zero displacement in a detection plane that is perpendicular to the plane of the drawing. The null signal is supplied to a signal conditioning circuit 68 that further amplifies the signal and converts the signal into an output signal that appears on the output line 38. Thus, the balancing control circuit 62 cooperates with the signal conditioning circuit 68 to form a closed loop detection circuit. Alternately, the output signal may be taken directly from the output of the balancing control circuit 62 (not shown), in which case, the balancing control circuit 62 becomes the closed loop detection circuit.

The closed loop operation described above provides increased linearity of output since the displacement of the proof mass is kept small in the detection plane. The closed loop operation also increases the bandwidth of the sensor while reducing drift over time and temperature variations. In general, for precision applications, a balanced angular rate sensor provides better performance.

Figure 7:
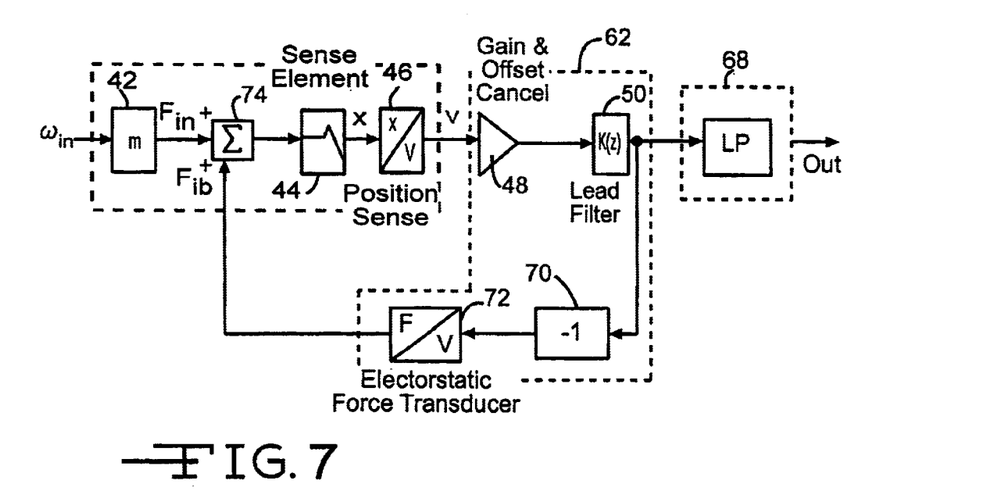
FIG. 7 is a bock diagram for sensor shown in FIG. 6.

The closed loop operation is further illustrated by the block diagram shown in FIG. 7. Components in FIG. 7 that are similar to components shown in FIG. 4 have the same numerical designators. As shown in FIG. 7, the output signal from the balancing control circuit 62 can be further conditioned by a low pass filter in block 68; however, this step is optional. Additionally, other conventional signal conditioning circuitry can be included in block 68 (not shown). The analog output signal from the balancing control circuit 62, which is proportional to the Coriolis force, is inverted by block 70 and then applied to a transducer 72. The transducer 72 converts the signal voltage to a force that is applied to a summing point 74. Because the signal was inverted, the summing point 74 functions to null the force applied to the sense element 44. Thus, the output signal from the balancing control circuit 62 becomes the null signal.

Figure 8:
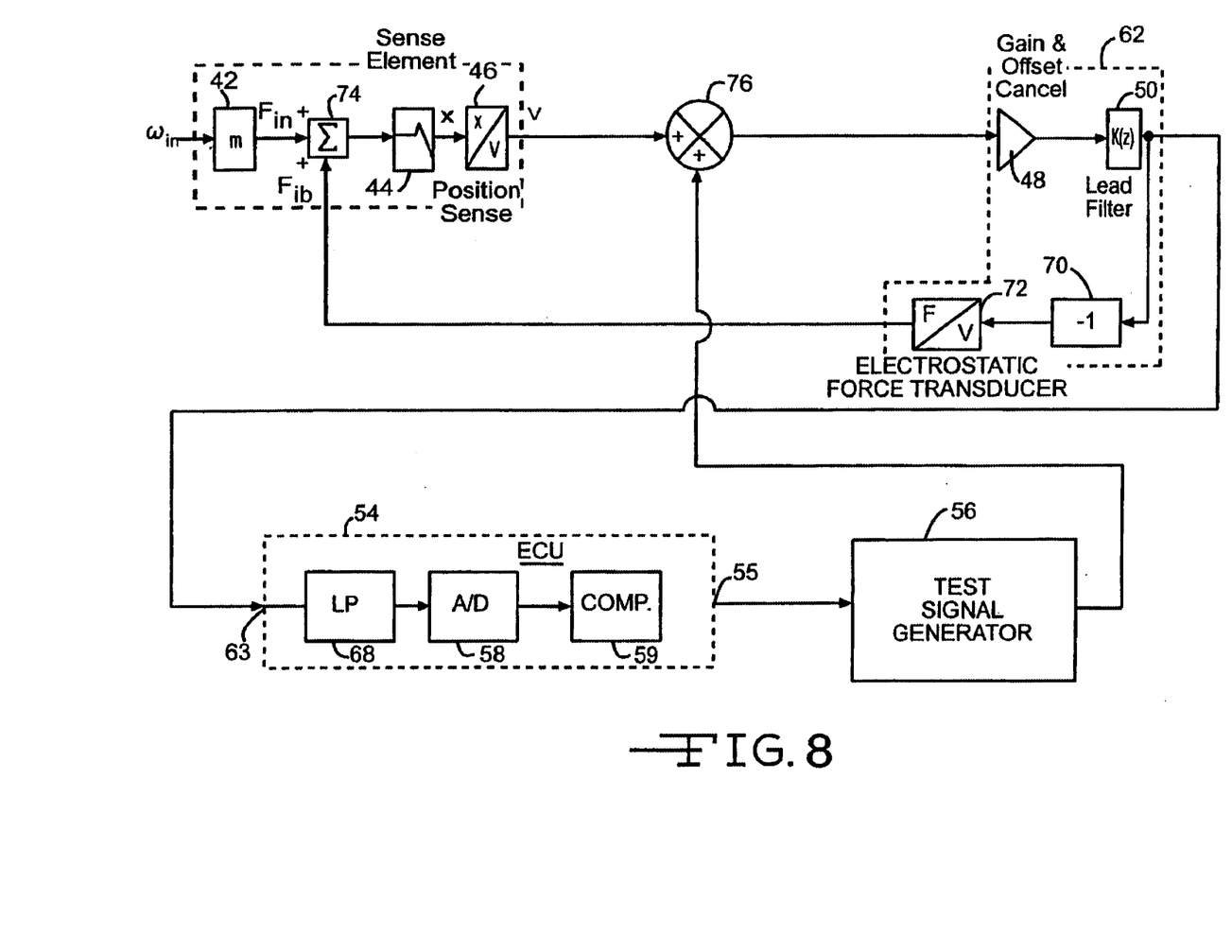
FIG. 8 is a block diagram for a test circuit for the sensor shown in FIG. 7 in accordance with the invention.

The present invention contemplates injecting a test signal at a second summing point 76, as illustrated in FIG. 8. Components that are similar to components shown in FIG. 5 have the same numerical designators. Note that the optional low pass filter 68 shown in FIG. 7 has been included in the ECU 54. The test signal is generated by the test signal generator 56 in response to a request by the ECU 54. The test signal generator 56 generates analog test signal that is injected at the second summing point 76 prior to the input of the signal feedback balancing control circuit 62. In this manner, the test signal injected at the sense element pick-off point 76 is equivalent to the secondary mode signal generated by a Coriolis force. Accordingly, the closed loop detection circuit is responsive to the test signal, in the same manner that it would be to a Coriolis force, to generate a feedback signal. The feedback signal is fed into the second feedback control loop of the sense element's detection drive. Therefore, the second feedback control loop generates a null signal that is applied to the sense element in response to the injected test signal while the closed loop detection circuit produces an output signal that is proportional to the test signal.

The resulting output signal from the balancing control signal circuit 62 is converted to a digital signal by the analog to digital convertor 58 and then supplied to the comparator 58. The comparator compares the output signal that corresponds to the test signal to the previous digital output signal. In the preferred embodiment, a change in the output signal indicate that the sensor output is being nulled and thus that the sensor is functioning properly. Conversely, if the output signal does not change, it is an indication that the sense element and the associated circuits are malfunctioning. Accordingly, an error flag is set and the sensor is disabled. Alternately, the output signal must change in response to the test signal by an amount that exceeds a predetermined minimum to preclude setting the error flag.

Additionally, in the preferred embodiment, the output signal from the balancing control circuit that corresponds to the test signal is compared to a first predetermined threshold. If the output signal exceeds the first threshold, the error flag set. In the preferred embodiment, the threshold value is a function of the test signal. Alternately, the absolute value of the difference between the output signal resulting from the test signal and the previous output signal can be compared to a second predetermined threshold. If the difference exceeds the second threshold, it is an indication of a malfunction and the error flag is set. The second threshold can be a predetermined value to provide a margin of acceptable performance or the second threshold can be zero. While the test signal generator 56 is shown in FIG. 8 as a separate component, it will be appreciated that the circuit can be included in the ECU 54 (not shown).

As described above, the test signal, or artificial Coriolis force signal, is converted into a feedback signal, which feeds into the second feedback control loop of the sense element's detection drive. The second feedback control loop then generates a null signal to cancel the injected test signal. Because the second feedback control loop includes the sense element 44, this approach forces a physical response of the sense element 44, which makes it a 100% thorough self test. For example, if a wire bond between the sense element 44 and the signal conditioning circuit should fail, the failure would go undetected with the prior art method of testing since the test signal is injected "downstream" of the sense element. With the present invention, because the signal must pass through the sense element 44, any failure associated with the sense element would be detected.

Figure 9:
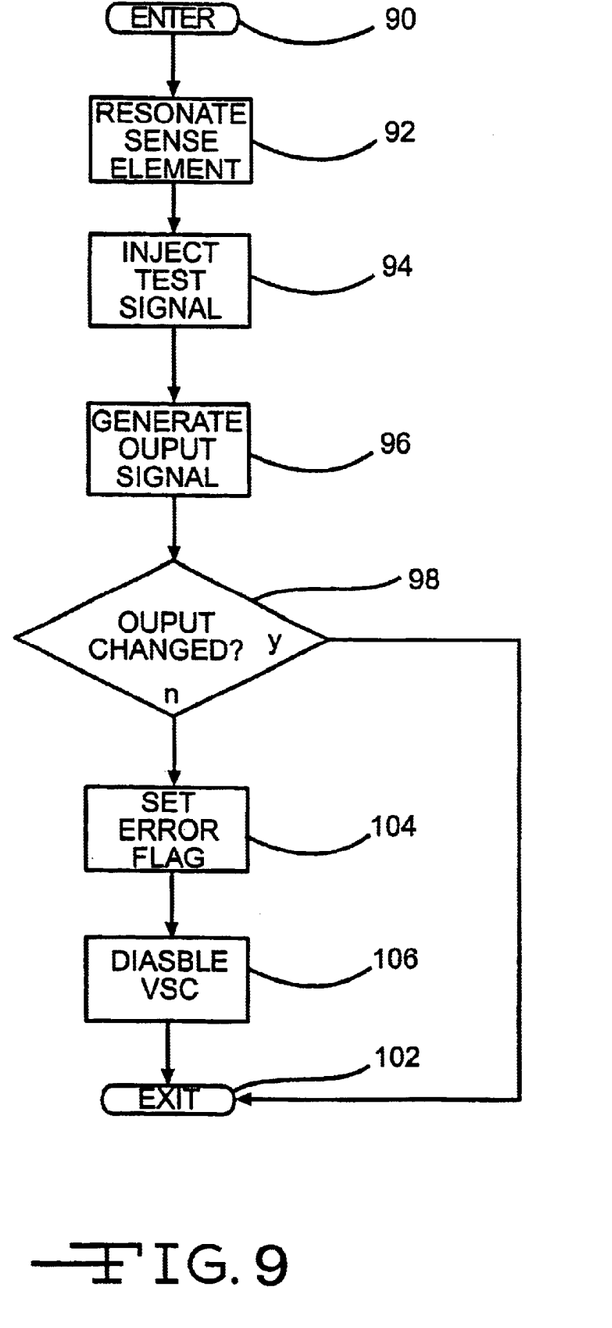
FIG. 9 is a flow chart for operation of the test circuit illustrated in FIG. 8.

The invention further contemplates a test algorithm that is illustrated by the flow chart shown in FIG. 9. The test algorithm is shown for a balanced resonant angular rate sensor 60 that uses a first closed loop control to drive the sense element of a angular rate sensor into resonance and a second closed loop control for detecting the effects of Coriolis force. The sensor is included in a Vehicle Stability Control (VSC) System.

The algorithm is entered through block 90. In functional block 92, the MEMS sensing element is resonated by the sense element drive circuit 30. Then, in functional block 94, an artificial test signal is injected into the closed loop control circuit that rebalances any Coriolis force that is acting upon the sense element. The artificial test signal is interpreted as a secondary mode signal, caused by Coriolis force. In functional block 96, a null signal is generated by closed loop detection circuit and driven through the sense element to cancel the secondary mode signal caused by the test signal. If the sense element and associated circuitry are working properly, an output signal that is proportional to the test signal will be generated.

In decision block 98 the output signal generated in response to the test signal is compared to the previous output signal. If the output signal has changed, the sense element and associated circuitry is working properly and the algorithm exits through block 102.

If, however, the output signal has not changed in decision block 98, the sense element and associated circuitry is defective and the algorithm transfers to functional block 104 where an error flag is set. The algorithm next transfers to functional block 106 to disable the associated VSC System. The algorithm then exits through block 102.

The test described above requires that the output signal remain unchanged to preclude setting an error flag, that is, the difference between the output signals before and after injection of the test signal is zero. The invention also contemplates an alternative embodiment in which the error flag is set if the change in the output signal due to the injection of the test signal is less than a predetermined minimum (not shown). The alternate embodiment allows a range of output values to trigger the error flag.

In the preferred embodiment, the test signal is a fixed offset that is about half of the full scale output of the sensor. Accordingly, a change in the output signal will be readily apparent if the sensor is not functioning properly.

Figure 10:
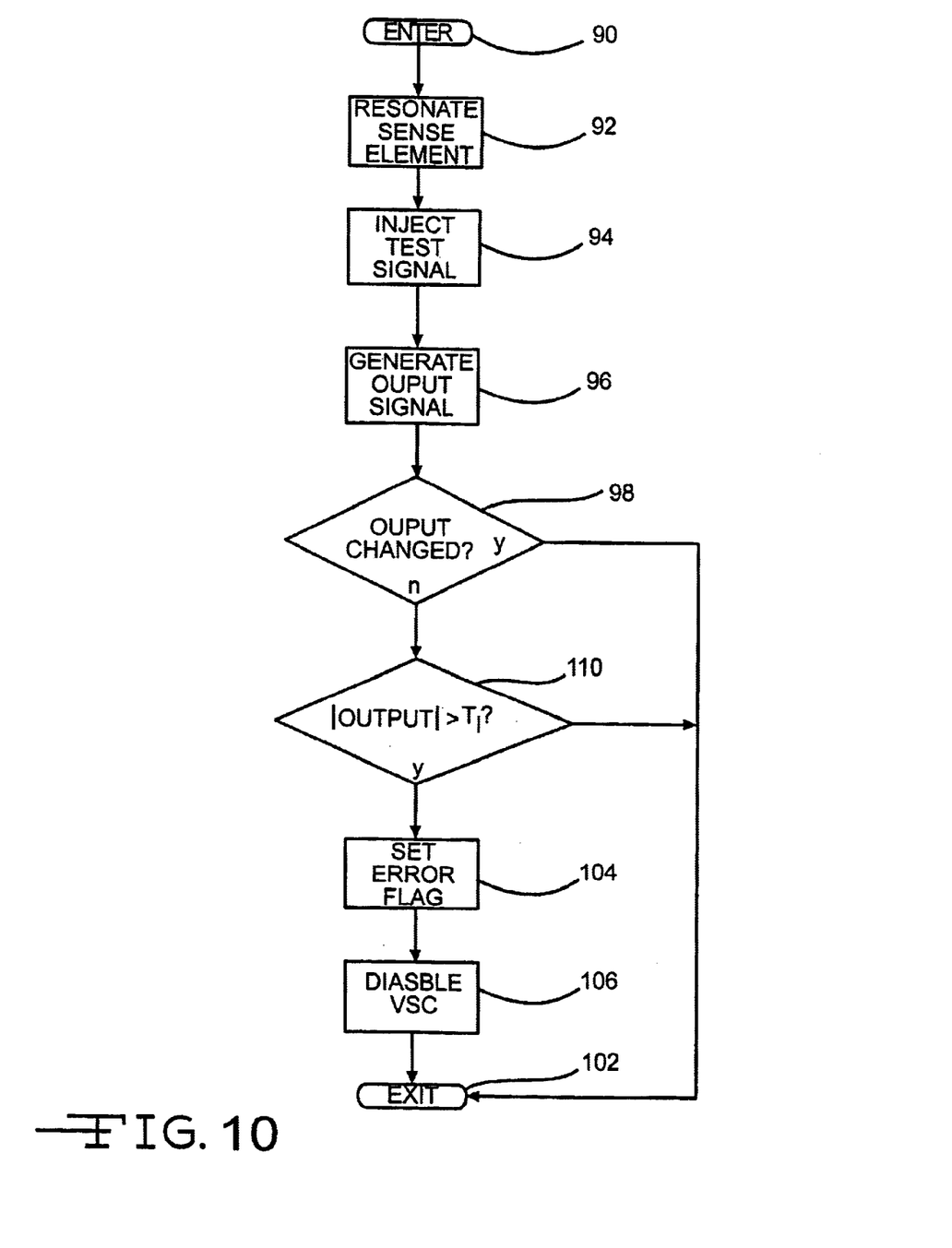
FIG. 10 is an alternate embodiment of the flow chart shown in FIG. 9.

The invention also contemplates an alternate embodiment that is illustrated by the flow chart shown in FIG. 10. As before, blocks shown in FIG. 10 that are the same as blocks shown in FIG. 9 have the same numerical identifiers. The algorithm proceeds as described above, except that an additional test is provided in decision block 110 where the absolute value of the output signal is compared to a first predetermined threshold, $T_1$. The algorithm transfers to functional block 104 and sets an error flag if the absolute value of the output signal exceeds the first threshold $T_1$.

Otherwise, the algorithm exits through block 102. Alternately, the absolute value of the difference between the output signal resulting from the test signal and the previous output signal can be compared to a second predetermined threshold in block 110 (not shown). If the difference exceeds the second threshold, it is an indication of a malfunction and the error flag is set. The second threshold can be a predetermined value to provide a margin of acceptable performance or the second threshold can be zero. Thus, the embodiment shown in FIG. 10 assures that the output signal generated by the test signal is within an acceptable range of values.

It will be appreciated that the schematic drawings and descriptions above are meant to be exemplary and that the invention also can be practiced with other circuits and sensor structures than those show and described.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and explained for angular rate sensors, it will be appreciated that the invention also can be practiced with linear accelerometers.

What is claimed is:

1. A device for measuring angular rate comprising:
    a resonant sensor element;
    a first feedback control device connected to said resonant sensor element, said first feedback control device operative to resonate said resonant sensor element;
    a second feedback control device connected to said resonant sensor element, said second feedback control device operative to sense the presence of a secondary mode signal generated by said resonant sensor element in response to a Coriolis force, said second feedback control device being responsive to said secondary mode signal to generate a null signal that cancels said secondary mode signal and to generate a first output signal that is proportional to said null signal; and
    a test device connected to said second feedback control device, said test device operative to inject a test signal to said second feedback loop that is passed through said resonant sense element, said test signal causing a second output signal that is proportional to said test signal, said test device further operative to compare said first and second output signals and to set an error flag if there is no difference between said first and second output signals resulting from said test signal.

2. The angular rate measuring device according to claim 1 wherein said test device is further operative to compare said second output signal resulting from said test signal to a first predetermined threshold and to set an error flag if said second output signal exceeds said first threshold.

3. The angular rate measuring device according to claim 2 wherein said first threshold is function of said test signal.

4. The angular rate measuring device according to claim 2 wherein said test device is included in an electronic control unit for a vehicle stability system.

5. The angular rate measuring device according to claim 1 wherein said test device is further operative to calculate a change between said first and second output signals due to said test signal and to set an error flag if the absolute value of said change is greater than a second predetermined threshold.

6. A method for testing an angular rate measuring device comprising the steps of:
    (a) providing a resonant sensor element, a first feedback control device connected to the resonant sensor element that is operative to resonate the resonant sensor element, and a second feedback control device connected to the resonant sensor element that is operative to sense the presence of a secondary mode signal generated by the resonant sensor element in response to a Coriolis force, the second feedback control device being responsive to the secondary mode signal to generate a null signal that cancels the secondary mode signal and to generate an output signal that is proportional to said null signal;
    (b) resonating the resonant sensor element to produce a first output signal;
    (c) injecting a test signal into the second feedback control device that is passed through the resonant sense element to produce a second output signal;
    (d) comparing the resulting first output signal to the second output signal produced in step (c) to determine a change between the first and second output signals; and
    (e) setting an error flag if any change between the first and second output signals is less than a predetermined minimum threshold.

7. A device for measuring angular rate comprising:
    a resonant sensor element;
    a first feedback control device connected to said resonant sensor element, said first feedback control device operative to resonate said resonant sensor element;
    a second feedback control device connected to said resonant sensor element, said second feedback control device operative to sense the presence of a secondary mode signal generated by said resonant sensor element in response to a Coriolis force, said second feedback control device being responsive to said secondary mode signal to generate a null signal that cancels said secondary mode signal and to generate a first output signal that is proportional to said null signal; and
    a test device connected to said second feedback control device, said test device operative to inject a test signal in to said second feedback loop that is passed through said resonant sense element, said test signal causing a second output signal that is proportional to said test signal, said test device further operative to compare said first and second output signals and to set an error flag if a difference between said first and second output signals resulting from said test signal is less than a predetermined minimum threshold.

8. A method for testing an angular rate measuring device comprising the steps of:
    (a) providing a resonant sensor element, a first feedback control device connected to the resonant sensor element that is operative to resonate the resonant sensor element, and a second feedback control device connected to the resonant sensor element that is operative to sense the presence of a secondary mode signal generated by the resonant sensor element in response to a Coriolis force, the second feedback control device being responsive to the secondary mode signal to generate a null signal that cancels the secondary mode signal and to generate an output signal that is proportional to said null signal;
    (b) resonating the resonant sensor element to produce a first output signal;

(c) injecting a test signal into the second feedback control device that is passed through the resonant sense element to produce a second output signal;

(d) comparing the resulting second output signal to the first output signal produced in step (b) to determine a change between the first and second output signals; and (e) setting an error flag if the output signal change is zero.

9. The method according to claim 8 further including, subsequent to step (e), comparing the absolute value of the second output signal to a first predetermined threshold and then setting the error flag if the absolute value of the second output signal exceeds the first predetermined threshold.

10. The method according to claim 9 wherein the first threshold is a function of the test signal.

11. The method according to claim 8 further including, subsequent to step (e), comparing the absolute value of the change between the first and second output signals to a second predetermined threshold and then setting the error flag if the absolute value of the output signal change exceeds the second predetermined threshold.

12. The method according to claim 9 wherein the angular rate measuring device is included in a vehicle stability system.

* * * * *

UNITED STATES PATENT AND TRADEMARK OFFICE
CERTIFICATE OF CORRECTION

PATENT NO.   : 6,792,792 B2
DATED        : September 21, 2004
INVENTOR(S)  : Michael L. Babala Page 1 of 1

It is certified that error appears in the above-identified patent and that said Letters Patent is hereby corrected as shown below:

Column 7,
Line 45, delete "to" and insert -- into --.
Line 58, after "is" insert -- a --.

Column 8,
Line 44, delete "in to" and insert -- into --.

Signed and Sealed this

Thirtieth Day of November, 2004

JON W. DUDAS
*Director of the United States Patent and Trademark Office*